United States Patent [19]
Joseph

[11] Patent Number: 6,020,568
[45] Date of Patent: Feb. 1, 2000

[54] ELECTRO MECHANICAL PROCESS AND APPARATUS FOR METAL DEPOSITION

[76] Inventor: Adrian A. Joseph, 27451 Maverick Cir., Laguna Hills, Calif. 92653

[21] Appl. No.: 09/058,267

[22] Filed: Apr. 10, 1998

Related U.S. Application Data

[60] Provisional application No. 60/041,893, Apr. 11, 1997.

[51] Int. Cl.[7] ................................................ B23K 9/04
[52] U.S. Cl. ................................................ 219/76.13
[58] Field of Search .................................. 219/76.13, 119

[56] References Cited

U.S. PATENT DOCUMENTS

| | | | |
|---|---|---|---|
| 3,360,630 | 12/1967 | Blaszkowski | 219/76.13 |
| 3,415,971 | 12/1968 | Shaffer | 219/76.13 |
| 3,832,514 | 8/1974 | Antonov | 219/76.13 |
| 4,226,697 | 10/1980 | Antonov et al. | 219/76.13 |
| 4,556,775 | 12/1985 | Inoue | 219/76.13 |
| 4,866,237 | 9/1989 | Inoue | 219/76.13 |

FOREIGN PATENT DOCUMENTS

| | | | |
|---|---|---|---|
| 694345 | 12/1979 | U.S.S.R. | 219/76.13 |

*Primary Examiner*—Clifford C. Shaw
*Attorney, Agent, or Firm*—Beehler & Pavitt

[57] ABSTRACT

A process is described for the diffusion or metallizing of one electrically conductive metallic material into and on to the matrix of a second electrically conductive metallic material. The process will occur when the second material is in a solid state condition and placed in closely spaced but not touching contact with the first conductive material, and both are subjected to an applied D.C. potential across the materials while the first metallic material is subjected to an ultrasound signal. The first material and the second material thus form an electrode pair. The material of the second metallic element is then deposited on the first and the first metallic material is effectively metallized by the second material. The material to be coated is moved, e.g., rotated, during the process while maintaining a small gap with respect to the other electrode. Also disclosed is a relatively simple apparatus for carrying out the method of this invention. Such apparatus basically includes an ultrasonic generator, a workpiece holder, mounting attachments for mounting the material to be coated on the ultrasonic horn, a D.C. and A.C voltage supply and a device to effect movement and rotation of the workpiece relative to the horn.

10 Claims, 1 Drawing Sheet

ELECTRO MECHANICAL PROCESS AND APPARATUS FOR METAL DEPOSITION

RELATED APPLICATIONS

This application replaces Provisional Application Ser. No. 60/041,893 filed Apr. 11, 1997.

FIELD OF INVENTION

This invention relates to coating and metallizing processes and apparatus for performing the same and more specifically to an improved method for coating and metallizing a workpiece through the use of ultrasound and an applied D.C. voltage and an improved apparatus for performing the process.

BACKGROUND OF THE INVENTION

It is known to deposit one or more ferrous or non-ferrous metals over another ferrous or non-ferrous metal by a variety of techniques, including vapor deposition and electrochemical deposition. Other methods such as heat treatment, anodizing, are spraying, vacuum deposition, sputtering ion implantation, fusion, etc. are also known and have been used. Each of these is a commonly known process but some are fairly sophisticated, costly in terms of equipment and cost of application and most of all slow, especially in the case of relatively high volume manufacturing operations.

There are several patents in the prior art which disclose various metallizing and coating techniques and related processes. See, for example: U.S. Pat. No. 3,098,150 of July 1963 in the name of Inuoe, as well as the following identified by U.S. patent number, month and year of grant and inventors name; U.S. Pat. No. 3,200,234 of August 1965 by Crawford; U.S. Pat. No. 3,277,266 of October 1966 by Blaszkowski; U.S. Pat. No. 3,741,426 of June 1973 by Inoue; U.S. Pat. No. 4,348,281 of August 1982 by Inoue; U.S. Pat. No. 4,405,851 of September 1983 by Sheldon; U.S. Pat. No. 4,566,992 of January 1986 by Joseph; U.S. Pat. No. 4,764,654 of August 1988 by Joseph; and U.S. Pat. No. 4,840,711 of January 1989, also by Joseph.

SUMMARY OF THE INVENTION

Generally, the process of this invention employs an electro mechanical device which includes an electrode which is required to be in close but spaced relation with the conductive and metallic matrix or substrate, i.e., a workpiece, to be treated and in which the material to be deposited is the form of an electrode composed of the desired coating material in order to achieve the surface and coating and characteristics required.

While the electrode or material to be coated is made one electrode of an electrode pair, the other electrode forms the substrate (workpiece) being metallized. The material depositing electrode is mounted on the horn of an ultrasonic power generator, to be described, while the material to be coated is in closely spaced relation with the material electrode. Thus positioned, a D.C. potential applied across the electrodes while the ultrasound generator is activated causing the material of the material to be coated to form a coating on the substrate to be coated.

In a preferred form, the workpiece is moved or rotated by being on a moveable table and/or mounted for eccentric rotation in a chuck or other workpiece holding device while the material to be coated is positioned in closely spaced relation to the workpiece to form a relatively small gap therebetween. If the surface to be coated is conical or spherical, then the electrode forming the material to be coated may be moved axially, while maintaining a small gap. The workpiece may also be moved laterally with respect to the coating electrode to assure that all desired surfaces or surface portions are coated. In addition, the electrode forming the material to be coated may be movable along a Y axis (vertically) to assure proper spacing and gap conditions.

More specifically this electro mechanical process is aimed at solving some of the common problems in metallizing and coating processes of the prior art, especially in terms of simplicity, effectiveness, speed, and coating characteristics and qualities of the coated and metallized part.

Accordingly, it is an object of the present invention to at least partially overcome the disadvantages of prior art coating and metallizing processes and apparatus by providing a novel process and apparatus for the deposition, and metallizing of a wide variety of materials (ferrous or non-ferrous and alloys thereof) one over the other.

It is a further object of this invention to provide a novel apparatus and method using a fast and simple deposition technique, which creates high bond strength, crystalline type micro structure coating, with very high coverage rate (close to 100%) at high speeds of deposition, and most of all by a relatively simple and economical process and apparatus.

It is further object of this invention to provide a process that is: environmentally safe, low in energy consumption, of relatively high efficiency in terms of material consumption, and which does not require skilled operators.

These objects and features of the present invention will become more apparent from the following detailed description of the process and apparatus which are for purposes of illustration only.

DETAILED DESCRIPTION OF THE INVENTION

Figure 1:
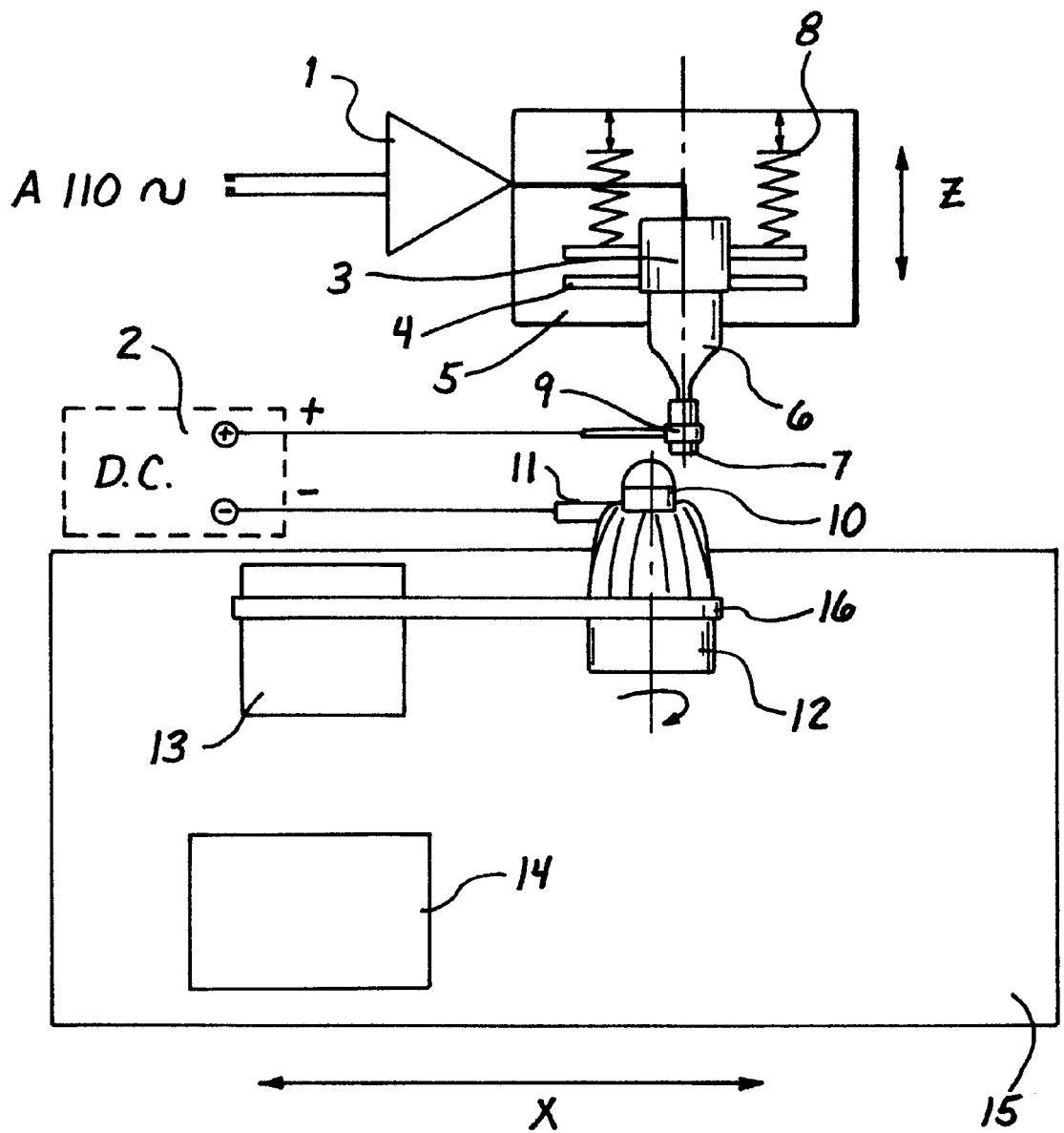
FIG. 1 is a diagrammatic illustration of a preferred form of the apparatus of this invention.

Referring to the drawing which illustrates a preferred form of the present invention, the apparatus illustrated includes an ultrasonic generator 1 supplied by a 110 volt A.C. power supply. Also forming part of the apparatus is a D.C. power source 2 to be described in more detail. The ultrasonic generator is itself well known in the art and may include a piezoelectric converter 3 and a piezoelectric and horn support 4. The piezoelectric converter 3 and horn support 4 are mounted in a suitable enclosure such as a traveling table 5 for movement in a vertical direction, i.e., a Y axis motion up and down.

Forming part of the ultrasonic generator is an ultrasound horn 6 also movable along a Y axis (up and down) with the remaining components of the table 5. Carried by the traveling table and extending out of the lower portion is a metallic electrode applicator 7 which forms one electrode of an electrode pair and which is attached to the ultrasonic horn.

The traveling table includes springs 8 or a pressure regulator for resiliently and shock mounting the ultrasonic horn assembly and for protecting the workpiece in the event that the movement of the table is such that contact is made between the coating and coated electrode, i.e., to prevent damage or grooving of the horn and the workpiece.

The D.C. power source 2 includes a positive output connected to the electrode 7, the latter firmly mounted on the horn by a suitable clamp, not shown. Positive D.C. potential is applied to the ultrasonic horn 6 by connector 9 while the negative D.C. output is connected to the workpiece 10, as illustrated. A spring mounted constant contact element 11, for example of graphite, applies a negative D.C. potential to the workpiece, i.e., the negative electrode of an electrode pair, the other electrode being mounted on the ultrasound horn, as described. Thus, the workpiece forms the cathode while the material to be coated forms the anode of an electrode pair.

In the form illustrated, workpiece is mounted on a rotating chuck 12 which may be an electric or hydraulic chuck. Depending on the nature and type of the workpiece, the latter may be eccentrically mounted on the chuck 12. It is also understood that, depending on the nature of the workpiece and the nature of the coating, the workpiece may be moved along an X axis without rotation or angularly with respect to the X axis. The apparatus also includes an electric motor 13, an electric motor 14 for lateral or X axis movement and a base 15 for carrying the electrode 10, the spring contact 11, the chuck 12, and the two motors 13 and 14. Motor 13 is used to drive the chuck 12 through a belt or other driving connection 16. It is understood that the motors may be electric or hydraulic motors and other types of drives may be used.

Thus, the apparatus includes as basic elements a D.C. power supplier to provide a direct current across the output. Electrodes are connected to the D.C. output, one being an anode and being the material to be coated and the other being the cathode or workpiece or the item to be coated. Also forming a basic part of the device is ultrasound equipment consisting of ultrasound power generator, piezoelectric converter, horn and electrode to be deposited on the matrix. The remaining components are those items needed to assure proper non-touching relation between the electrodes and desired relative movement.

The power supply horn/electrode device provides a mechanical transmitter and applies the D.C. output (positive contact) to the working part, the ultrasound mechanical mechanism creating a micro spark at the gap between the electrode and matrix resulting in a constant deposition of the applied material in a micro form, and at the same time fracturing the surface of the matrix to achieve a better, deeper deposition resulting in a better bond.

The gap between the depositing electrode on the ultrasonic horn and the workpiece may be in the order of 0.001 inches and may be adjusted to be smaller or larger, provided, however, that the two electrodes are spaced the necessary gap distance to achieve coating. Typically a gap of 0.001 inches is adequate. The material to be coated may be any electrically conductive pure ferrous or non-ferrous metal or alloy. For example, the deposited material may be tungsten carbide for tool or die hard facing or materials such as copper and chromium alloys for resistance welding type electrodes, e.g., 97% copper and 3% chromium, by weight. The electrical conductivity of the electrodes should be such that a spark may be formed in the gap. Most ferrous and non-ferrous metals and alloys may thus be used.

The coating area may be a circular deposit of about 0.250 inches or 0.3 inches depending on the nature of the workpiece. For welding electrodes which typically include a rounded or spherical end, this dimension for a tip coating is satisfactory. For other workpieces such as cutting tools or dies, larger surface areas my be coated. The workpiece need not be symmetrical, but should be an electrically conductive ferrous or non-ferrous material or alloy. The thickness dimension of the coating may range from 1 micron to 5 microns, although it is understood that a workpiece may be coated in several passes to a achieve a greater thickness dimension. The range given is typically for a one pass coating, that is, the track of the path is not changed during the procedure. For example, in coating a rotating part, one may continuously rotate the part, but not shift it in an X dimension. As long as the track remains the same, coating will take place over the same band. This is considered one pass even though the workpiece surface is different at any instance in time. As the workpiece is moved in an X direction, another band is coated. It is also understood that the thickness dimension of the coating is related to the length of time a particular region of the workpiece remains in the gap region.

As is the case in any coating procedure, the surface to be coated should be cleaned and degreased prior to coating. Procedures for cleaning and degreasing are well known in the art. In the event that a particular portion of a workpiece is not to be coated, or coated in a pattern for whatever reason, one may apply a stop coating to the surface not to be coated. Typical stop coating materials are waxes or thin oil coatings or greases of the type that do not readily flow and which will remain where place, or ceramic coatings. It is preferred that the stop coating material be such that it will not flow when heated since there may be some localized heating as a result of the spark generated during the metallizing process. The stop coating material may be any one of a variety of materials which effectively place a high electrical resistance in the gap or which prevents the spark from contacting the workpiece. It is preferred that the stop coating material be such that it is easily cleaned from the part.

The applied D.C. voltage may be in the range of 0.5 volts D.C. and 40 volts D.C. depending on the material of the electrodes and the gap dimension. The frequency of the ultrasound may be in the range of between 10 kHz and 40 kHz.

It is also the case that the workpieces may be automatically fed to the chuck in the proper orientation and automatically chucked. These devices are well known and may be of the type used to feed workpieces to a machine tool. The apparatus of this invention may be computer controlled using controllers of the type used with machine tools such as a Fanuk controller which may be programmed to cause the workpiece and the ultrasonic horn to move in a controlled X-Y-Z coordinate direction. In effect, this allows the workpiece to be rotated and moved in a controlled manner along the X axis while the coating electrode may be along the Y and Z axis. Other multiple axis controlled movements may be used as are commonly used with multiple axis machine tools.

By the process of this invention, a high quality coating or layer is deposited on a workpiece in a relatively short time and is tightly adherent to the workpiece.

It will be apparent to those skilled in the art from the above detailed description and drawing of the preferred form of the present invention that various changes and modifications, as will be apparent to those skilled in the art, may be made without departing from the spirit and scope of this invention, except as set forth in the appended claims.

What is claimed is:

1. A process for metallizing a conductive workpiece, comprising the steps of:

positioning a conductive workpiece in closely spaced relation to an electrode, said electrode being conductive and composed of a solid material to be deposited on at least a portion of the surface of said workpiece, mounting said electrode on the horn of an ultrasonic generator, applying a direct current potential across said workpiece and said electrode to generate a spark in the gap between the workpiece and the electrode, and activating said ultrasonic generator while said direct current potential is applied across the workpiece and the electrode to cause deposit of said electrode material on at least a portion of said workpiece.

2. A process for metallizing a conductive workpiece as set forth in claim 1 wherein there is relative movement between said workpiece and said electrode while said gap is maintained between the two.

3. A process for metallizing a conductive workpiece as set forth in claim 1 wherein a negative potential is applied to the workpiece and a positive potential is applied to said electrode.

4. A process for metallizing a conductive workpiece as set forth in claim 1 wherein said workpiece is moved laterally with respect to said electrode.

5. A process for metallizing a conductive workpiece as set forth in claim 1 wherein the gap between said workpiece and said electrode is in the order of 0.001 inches.

6. A process for metallizing a conductive workpiece as set forth in claim 1 wherein the applied direct current potential is in the range of 0.5 volts to 40 volts.

7. A process for metallizing a conductive workpiece as set forth in claim 1 wherein the frequency of the ultrasound is between 10 kHz and 40 kHz.

8. A process for metallizing a conductive workpiece as set forth in claim 1 wherein a stop coating material is applied to said workpiece.

9. A process for metallizing a conductive workpiece as set forth in claim 1 wherein said workpiece is coated with tungsten carbide.

10. A process for metallizing a conductive workpiece as set forth in claim 1 wherein said workpiece is a welding electrode and includes a curved end, and said coating on said electrode is a copper and chromium alloy.

* * * * *